United States Patent Office 2,810,758
Patented Oct. 22, 1957

2,810,758

STEROID AND INTERMEDIATE COMPOUNDS

William S. Johnson, Madison, Wis., Brian Bannister, Kalamazoo, Mich., and Edgar R. Rogier, Minneapolis, Minn., assignors to Wisconsin Alumni Research Foundation, Madison, Wis., a corporation of Wisconsin No Drawing. Application May 26, 1955, Serial No. 511,396

13 Claims. (Cl. 260—586)

The present invention relates to the steroid field. More specifically the invention is directed to improved processes and resulting products having particular utility in the synthesis of non-aromatic steroids. The invention also includes a novel, physiologically active, non-aromatic steroid produced by the processes and employing the intermediates of our invention.

In the copending application of William S. Johnson, Serial No. 301,369, filed July 28, 1952, and now abandoned, there is disclosed the product 1-methoxy-8-keto-10a-methyl - 5,6,8,9,10,10a,11,12 - octahydrochrysene (I, where R is methyl) and processes of preparing the same. The present invention is concerned with the selective reduction of the double bonds at the 6a,7- and 4b,10b-positions as well as of the carbonyl group at $C_8$. The tetracyclic ketone I was treated with ethyl orthoformate to produce the crystalline enol ethyl ether II, M. P. 136°, with $\lambda$ max. 227 m$\mu$ (log $\epsilon$ 4.58), which is characteristic of the diene structure and shows that the styrene double bond remained at 4b, 10b and had not migrated to the alternate 4b,5-position. The structure was confirmed by hydrolytic regeneration of the tetracyclic ketone I. The 6,6a-double bond of the enol ether was selectively hydrogenated over palladium-on-strontium carbonate giving a product which did not appear to be homogeneous, and probably consisted of a mixture of the dihydro enol ether with the double bond at 7, 8 and 8, 9. The latter, which is a rearrangement product of the former, corresponds to the structure that was established for the dihydro enol ether of cholestenone. Acid hydrolysis of the dihydro enol ether gave a single product, M. P. 176°, which has been shown to be the expected A/B transdihydro ketone IV. The ultraviolet absorption spectrum of IV, $\lambda$ max. 222 and 265.5, is typical of the m-methoxy-styrene chromophore. The $\lambda$ min. at 244 m$\mu$ (log $\epsilon$ 3.88) as compared with the intense absorption (log $\epsilon$ about 4.35) for the tetracyclic ketone I clearly shows that the $\alpha,\beta$-unsaturated ketone chromophore was lost, and that the 6a,7-double bond was indeed reduced.

The enol acetate XVI, M. P. 138°, was formed readily from the tetracyclic ketone I. Reduction of XVI with sodium borohydride yielded a dihydro alcohol represented by Formula XVII.

Hydrogenation of the tetracyclic ketone I over palladium-on-carbon in the presence of a trace of potassium hydroxide resulted in stereoselective reduction to give a new dihydro ketone, M. P. 121°, in high yield. The ultraviolet spectrum was identical with that of IV showing only the m-methoxystyrene chromophore; hence the new stereoisomer must be the A/B-cis-dihydro ketone XI.

Both dihydro ketones IV and XI underwent stereoselective reduction with lithium aluminum hydride to give crystalline hydroxy compounds formulated as VII (hydroxyl 8$\beta$) and X (hydroxyl 8$\alpha$), respectively. It is noteworthy that the reduction product of IV gave a precipitate with digitonin while that from XI did not, which is consistent with the $\beta$ and $\alpha$ orientation of the hydroxyl groups, respectively.

Catalytic hydrogenation of the A/B trans-dihydro ketone IV over 30% palladium hydroxide-on-strontium carbonate proceeded stereoselectively to give the trans-anti-cis ketone-A, M. P. 187°. A small proportion of the trans-anti-trans ketone-B (described below) was isolated from mother liquors. Ketone-A could also be produced from the enol ether II by allowing the hydrogenation to proceed beyond the dihydro stage (III) to reduce the styrene bond. Acid hydrolysis of the resulting tetrahydro enol ether gave ketone-A. The ultraviolet absorption spectrum of this ketone—$\lambda$ max. 271.5 m$\mu$ (log $\epsilon$ 3.09), 278.5 (3.13); $\lambda$ min. 243.5 (1.98), 275.5 (3.04)—is practically identical with that of 5-methoxytetralin showing clearly that the styrene bond was indeed reduced.

Reduction of ketone-A either with lithium aluminum hydride or by hydrogenation over platinum oxide proceeded stereoselectively yielding an alcohol, M. P. 132° represented by Formula VIII. This product was also formed directly by palladium-catalyzed hydrogenation of 1 - methoxy - 8 - hydroxy - 10a - methyl - 5,6,8,9,10,10a,11,12-octahydrochrysene, M. P. 147°, which was obtained by the action of lithium aluminum hydride on the tetracyclic ketone I.

When the A/B-trans-dihydro ketone IV was converted to the ethylene ketal V, M. P. 112°, and this derivative treated with lithium and alcohol in ammonia, the 4b,10b-(styrene) double bond was reduced stereoselectively to produce VI, M. P. 124°, which on acid hydrolysis yielded a tetrahydro ketone, M. P. 211°, having an ultraviolet spectrum identical to that of ketone-A. This new isomer is the trans-anti-trans ketone-B. Ketone-B could also be obtained in somewhat lower yield by lithium-ammonia-alcohol reduction of the dihydro enol ether III followed by acid hydrolysis. In the reduction of the ketal V described above, a small yield of an isomeric tetrahydro ketal, M. P. 138°, was isolated, and this on acid hydrolysis yielded ketone-A. When the ketal V was treated with lithium in ammonia at 150 p. s. i. and 25°, then with alcohol at atmospheric pressure, extensive demethylation as well as reduction occurred yielding the ketal phenol (Formula VI with OH in place of $OCH_3$ at the 1-position), M. P. 191°, which on acid hydrolysis afforded the trans-anti-trans phenolic ketone, M. P. 235°.

Lithium aluminum hydride reduction of ketone-B proceeded stereoselectively to give an alcohol, M. P. 124° and 137°, which gave a precipitate with digitonin and is represented by Formula IX in which the hydroxyl group is $\beta$-oriented. The best method of preparing this alcohol is by a one-step reduction of the tetracyclic ketone I with sodium or lithium and alcohol in ammonia. The product was conveniently isolated as the acetate, M. P. 146°.

Catalytic hydrogenation of the A/B cis-dihydro ketone XI over 30% palladium hydroxide-on-strontium carbonate proceeded stereoselectively to give a new tetrahydro ketone, M. P. 104°, having an ultraviolet spectrum identical with that of ketone-A showing that the 4b,10b-(styrene) bond was reduced. The configuration has been proved to be cis-syn-cis ketone-C. Lithium aluminum hydride reduction of ketone-C gave stereoselectively the corresponding alcohol, M. P. 125°, which failed to give a precipitate with digitonin and is assigned the 8$\alpha$-configuration.

Conversion of the A/B cis-dihydro ketone XI to the ketal XII, followed by lithium and alcohol in ammonia resulted in reduction of the 4b,10b-(styrene) double bond, as shown by ultraviolet spectroscopy, to produce a mixture of tetrahydro ketals, M. P. 110° and 211°. The former (XIII), preponderant isomer on acid hydrolysis yielded a new tetrahydro ketone, M. P. 136°, which proved to be the cis-anti-trans ketone-D. The higher-melting ketal, XIV, yielded on hydrolysis another tetrahydro ketone, M. P. 174°, which is formulated as the cis-anti-cis ketone-E, by analogy to the configuration of the product formed in lesser amount upon similar reduction of the A/B trans-dihydro ketal V. Both ketones-D and -E had ultraviolet spectra identical with that of ketone-A. Reduction of ketone-E with lithium aluminum hydride gave a mixture of $C_8$ epimeric alcohols, M. P. 181° and 158°. The latter, but not the former, gave a precipitate with digitonin and the alcohols are accordingly assigned the 8β and 8α configurations, respectively.

1-methoxy-6a-acetoxy-8-keto-10a - methyl - 5,6,6a,7,8,9,10,10a,11,12-decahydro-chrysene (XXII) (cf. W. S. Johnson, Ser. No. 424,505, filed April 20, 1954, and now abandoned) was hydrogenated in the presence of 30% palladium hydroxide on strontium carbonate catalyst to give the 4b,10b-dehydro compound (XXIII). The large acetyl group offers hindrance to the approach of the catalyst to the backside of the molecule, thus hydrogen preferentially adds to the topside, and the resulting compound thus has the trans-syn-cis configuration. Five hours heating of (XXIII) with sodium methoxide gave ketone-F(XXIV). Reduction of ketone-F with lithium and alcohol in liquid ammonia gave the carbinol (XXV).

To continue the synthesis of the non-aromatic steroids, the 1-alkoxy-8-hydroxy-10a - methyl - 4b,5,6,6a,7,8,9,10,10a,10b,11,12-dodecahydrochrysenes (VIII, IX and other stereoisomers) prepared as described above, are reacted with lithium in the presence of ethanol and liquid ammonia to reduce partially the aromatic ring to give the corresponding hexadecahydrochrysenes of the Formulas XVIII or XIX. The remaining double bond is then reduced by catalytic hydrogenation to give an octadecahydrochrysene of the Formula XX. Chromic oxide oxidation of the latter gives a diketone of the Formula XXI.

A specific and preferred aspect of the invention comprises the preparation of dl-18-nor-D-homoandrostane-3,17a-dione (XXI trans-anti-trans-anti-trans configuration) which possesses androgenic activity; assay in rats showed it to be at least one-tenth as active as testosterone. This represents the first reported totally synthetic androgenic substance of any appreciable activity. dl-18-nor-D-homoandrostan-3β-ol-17a-one (XX, trans-anti-trans-anti-trans configuration) is also useful as an intermediate in the preparation of the naturally occurring androgens, e. g. epiandrosterone. Condensation of XX with furfural, introduction of an angular methyl group in the 13-position (cf. W. S. Johnson, J. Am. Chem. Soc. 65, 1317 (1943)) and acetylation of the 3-hydroxy group gave dl-17-furfurylidene-D-homoepiandrosterone acetate (M. P. 192-192.5° C.; C, 76.19; H, 8.53). Ozonolysis of the latter followed by esterification with diazomethane afforded dl-dimethyl 3β-acetoxyetioallobilianate (M. P. 136-137° C.; C, 68.12; H, 9.29) having an infrared spectrum identical with that of the bilianate prepared by degradation of authentic epiandrosterone. Dieckmann cyclization of the bilianate with potassium tertiary-butoxide, followed by acid hydrolysis, gave dl-epiandrosterone (M. P. 161–162° C.; C, 78.42; H, 10.49) having an infrared spectrum indistinguishable from that of d-epiandrosterone derived from natural sources.

By analogous procedures, the 3-hydroxy compound corresponding to the cis-anti-trans ketone-D can be reduced to an octadecahydrochrysene having a A/B cis-ring juncture which is a precursor of the naturally occurring progestational and cortical hormones.

Charts 1, 2 and 3 illustrate by general formulae various reactions referred to above.

CHART I.—(A/B TRANS SERIES)

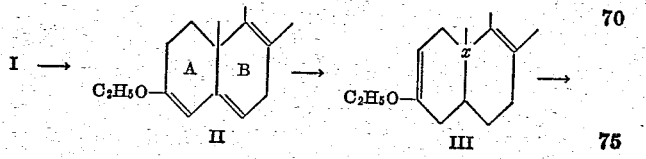

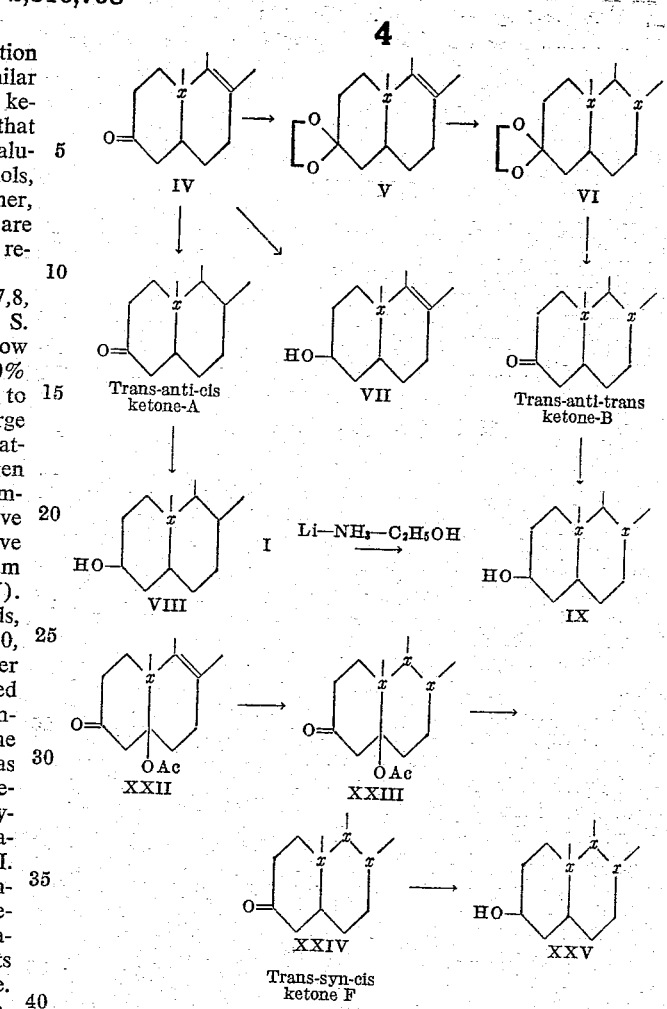

CHART 3

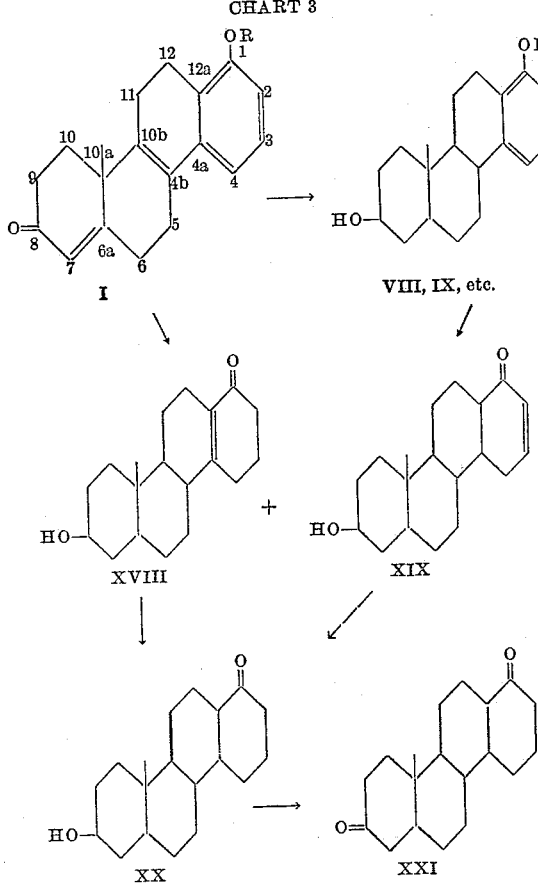

EXAMPLE I 1-methoxy-8-ethoxy-10a-methyl-5,9,10,10a,11,12 - hexahydrochrysene (II)

A solution of 49.2 g. of tetracyclic ketone I, M. P. 173.5–175.5° in 250 ml. of dry benzene, 25 ml. of absolute ethanol and 49 g. of ethyl orthoformate was confined to an atmosphere of nitrogen, then 4 ml. of a solution of 15% hydrogen chloride in absolute ethanol was added and the mixture heated under reflux. Two additional 1.5 ml. portions of the alcoholic hydrogen chloride solution were added after 3 hours and then after 8 hours. After refluxing for a total of 22 hours, the mixture was cooled, shaken with 15 g. of sodium hydroxide dissolved in dilute alcohol. Water was added (and more benzene if the enol ether began to crystallize), the benzene layer separated, and the aqueous layer extracted with ether. The combined organic layers were washed with saturated sodium bicarbonate solution, water, and dried over anhydrous magnesium sulfate. The pale yellow solid obtained on removal of the solvent was crystallized from a mixture of 115 ml. of benzene and 790 ml. of absolute ethanol containing 1 ml. of pyridine. The enol ether crystallized as pale yellow needles, M. P. 133–138.5°. This product was satisfactory for the hydrogenation. A sample repeatedly recrystallized from absolute ethanol containing a trace of pyridine was obtained as pale greenish yellow needles, M. P. 134–136°, λ max. 227 mμ (log ε 4.58).

Calcd. for $C_{22}H_{26}O_2$: C, 81.95; H, 8.13. Found: C, 81.8; H, 8.18.

EXAMPLE II 1-methoxy-8-ethoxy-10a-methyl-5,6,6a,7,10,10a,11,12-octahydrochrysene (III)

A solution of 39.52 g. of the enol ether (II) in 177 ml. of 95% ethanol and 354 ml. of benzene was hydrogenated over 5.0 g. of 6% palladium-on-strontium carbonate at room temperature and 30–40 p. s. i. The reaction was interrupted after the calculated amount (for one double bond) of hydrogen was absorbed, the mixture was filtered, and the filtrate evaporated. The oily residue was dissolved in 400 ml. of hot absolute ethanol containing a trace of pyridine, and on cooling crystals separated, M. P. 114–120°. This material was satisfactory for the next stage.

Analysis.—Calcd. for $C_{22}H_{28}O_2$: C, 81.44; H, 8.70. Found: C, 81.2; H, 8.69.

EXAMPLE III

Trans-1-methoxy-8-keto-10a-methyl-5,6,6a,7,8,9,10,10a,11,12-decahydrochrysene (IV)

To a boiling solution of 7.95 g. of dihydro enol ether (III), M. P. 114–119° in 10 ml. of benzene was added in succession 230 ml. of boiling 95% ethanol, 40 ml. of water, 4.5 ml. of 12 N hydrochloric acid, and 35 ml. of water. The mixture was allowed to stand at room temperature for 5 hours, then for 2 hours at 0°. The pale yellow crystals which separated were recrystallized from 40 ml. of n-butyl acetate giving prisms, M. P. 167–172°. Sublimation at 180–190° (0.05 mm.) gave material, M. P. 168–172°, of sufficient purity for hydrogenation to the tetrahydro ketone A. A specimen repeatedly recrystallized from ethyl acetate was obtained as colorless prisms, M. P. 175.5–176°, λ max. 222 mμ (log ε 4.49), 265.5 (4.14); λ min. 244 (3.88).

Analysis.—Calcd. for $C_{20}H_{24}O_2$: C, 81.04; H, 8.16. Found: C, 81.2; H, 8.44.

EXAMPLE IV 1-methoxy-8-acetoxy-10a-methyl-5,9,10,10a,11,12-hexahydrochrysene (XVI)

A solution of 0.84 g. of the tetracyclic ketone (I) in 2 ml. of acetic anhydride and 3 ml. of acetyl chloride was heated under reflux (nitrogen atmosphere) in an oil bath at 95–105° for 2 hours. The mixture was cooled, the solvent evaporated at reduced pressure, and the residue recrystallized from absolute ethanol giving crystals, M. P. 135–138°. Evaporative distillation at 190° (0.07 mm.) followed by crystallization from absolute ethanol afforded greenish yellow needles, M. P. 136.5–138.5°, λ max. 224 mμ (log ε 4.61). This material was again evaporatively distilled before analysis.

Analysis.—Calcd. for $C_{22}H_{24}O_3$: C, 78.54; H, 7.19. Found: C, 78.4; H, 7.12.

EXAMPLE V 1-methoxy-8β-hydroxy-10a-methyl-5,7,8,9,10,10a,11,12-octahydrochrysene (XVII)

A solution of 1.00 g. of the enol acetate XVI, M. P. 136–138°, in 100 ml. of 95% ethanol was cooled to 5° and added slowly to a stirred, cooled (ice bath) solution of 2.54 g. of sodium borohydride in 65 ml. of 75% aqueous ethanol. After the addition was complete, 32 ml. of 10% sodium hydroxide solution was added, the mixture heated under reflux for about 30 minutes, then most of the solvent was removed at 60° (12 mm.). The product was taken up in ether, washed thoroughly with water, and dried over anhydrous sodium sulfate. The oil obtained upon evaporation of the solvent was dissolved in 15 ml. of 95% ethanol, 0.3 ml. of concentrated hydrochloric acid was added and the mixture boiled under reflux in an atmosphere of nitrogen for 1 hour. The brown solution was neutralized with solid potassium carbonate, distilled at 80° (10 mm.) to remove alcohol, and the residue extracted with ether. The ether solutions were washed thoroughly with water, dried over anhydrous sodium sulfate and concentrated. The yellow-red oily residue was crystallized from a concentrated ether solution by cooling in a Dry Ice-acetone bath. The crystalline product after washing with ether had a M. P. 72–75°. The acetate, prepared with isopropenyl acetate and -p-toluenesulfonic acid, was obtained as a colorless solid, M. P. 136–139°. Three recrystallizations from diisopropyl ether (peroxide-free) gave colorless elongated prisms, M. P. 142–142.5°, $\lambda$ max. 267 m$\mu$ (log $\epsilon$ 3.96), 272.5 (3.98); $\lambda$ min. 246 (3.62).

EXAMPLE VI

Cis - 1 - methoxy-8-keto-10a, methyl-5,6,6a,7,8,9,10,10a,-11,12,decahydrochrysene (XI)

A mixture of 6.00 g. of the tetracyclic ketone I, M. P. 175–176°, 0.10 g. of 10% palladium-on-carbon, 5 ml. of 95% ethanol, 50 ml. of benzene, and 1 drop of 10% potassium hydroxide solution was agitated with hydrogen at room temperature and atmospheric pressure. In 1 hour the absorption of gas, which was 101% of that calculated (for one double bond), ceased. The mixture was filtered, and the filtrate evaporated leaving crude cis-dihydro ketone, M. P. 117.5–119°. Recrystallization from 95% ethanol gave a product, M. P. 119.5–121°. A specimen which was repeatedly recrystallized from methanol was obtained as colorless blades, M. P. 123–124°.

Analysis.—Calcd. for $C_{20}H_{24}O_2$, C, 81.04; H, 8.16. Found: C, 81.1; H, 8.52.

EXAMPLE VII

Trans - 1 - methoxy-8$\beta$-hydroxy-10a-methyl-5,6,6a,7,8,9,-10,10a,11,12-decahydrochrysene (VII)

To an ice cold solution of 0.500 g. of the transdihydro ketone (IV), M. P. 175–178°, in 20 ml. of dry purified dioxane and 60 ml. of dry ether was added with swirling 15 ml. of a solution of 0.258 M lithium aluminum hydride in ether over a period of 5 minutes. The mixture was boiled under reflux for 1 hour, cooled, 1 ml. of water cautiously added, and the granular precipitate which formed was washed by decantation with ether and benzene. The organic solutions were dried over anhydrous sodium sulfate, and evaporated. The residue was crystallized from chilled acetone-ether to give colorless prisms, M. P. 86.4–94.8°.

Analysis.—Calcd. $C_{20}H_{26}O_2$: C, 80.49; H, 8.78. Found: C, 80.1; H, 8.43.

The alcohol gave a precipitate with digitonin, the crude digitonide melting at 175–225°.

The benzoate of VII prepared from benzoyl chloride and pyridine was crystallized from benzene-petroleum ether (60–68°) giving colorless prisms, M. P. 193.4–201.4°. Sublimation at 160° (0.05 mm.) followed by recrystallization gave material, M. P. 197.2–200.2°. The purest specimen prepared after repeated recrystallization melted at 202.9–203.5°.

Analysis.—Calcd. $C_{27}H_{30}O_3$: C, 80.56; H, 7.51. Found: C, 80.8; H, 7.54.

EXAMPLE VIII

Cis-1-methoxy-8$\alpha$-hydroxy-10a-methyl-5,6,6a,7,8,9, 10, 10a, 11,12-decahydrochrysene (X)

A solution of 2.434 g. of the cis-dihydro ketone XI, M. P. 119.5–120.5° in 20 ml. of dioxane and 70 ml. of ether was reduced with 45 ml. of a solution of 0.402 M lithium aluminum hydride in ether by the procedure described above for the trans isomer. The crude product had a M. P. 147.3–150.8°. Crystallization from benzene-petroleum ether (60–68°) gave colorless needles, M. P. 156–158° with previous softening. Repeated recrystallization from petroleum ether (60–68°) raised the M. P. to 158.5–159.1°, $\lambda$ max. 222.5 m$\mu$ (log $\epsilon$ 4.37), 269 (4.06); $\lambda$ min. 244.5 (3.71).

Analysis.—Calcd. $C_{20}H_{26}O_2$: C, 80.49; H, 8.78. Found: C, 80.3; H, 8.81.

This material failed to give a precipitate with digitonin.

The acetate prepared from acetic anhydride and pyridine was obtained after sublimation at 130° (0.05 mm.), M. P. 129–134°. Repeated recrystallization from acetone followed by sublimation at 130° (0.05 mm.) gave small colorless prisms, M. P. 126–126.8°.

The cis-8$\alpha$-hydroxy compound, M. P. 154.3–155.8° with previous softening was also prepared by hydrogenating the cis-dihydro ketone XI over platinum oxide in dioxane containing a trace of concentrated hydrochloric acid.

EXAMPLE IX

Trans - anti - cis - 1 - methoxy-8-keto-10a-methyl-4b,5,6, 6a,7,8,9,10,10a,10b,11,12-dodecahydrochrysene (A)

A suspension of 3.0 g. of 30% palladium hydroxide-on-strontium carbonate in 100 ml. of benzene and 100 ml. of 95% ethanol was shaken with hydrogen at room temperature and 30–40 p. s. i. until no more gas was absorbed (about 12 minutes). A solution of 12.16 g. of sublimed trans-dihydro ketone IV, M. P. 168–172°, in 100 ml. of benzene was then added and the shaking continued at room temperature and 30–40 p. s. i. After 2 hours the hydrogenation had become very slow and approximately the calculated amount (for one double bond) of gas was absorbed. The mixture was filtered, the filtrate evaporated under reduced pressure and the colorless crystalline residue recrystallized from n-butyl acetate. The colorless prisms obtained in the first crop had a M. P. 183.5–186.5° (vac.) with previous shrinking.

The specimen of this ketone A, M. P. 166–174° (in an open tube) obtained by hydrolysis of the ketal was recrystallized from ethyl acetate and then sublimed at 170° (0.03 mm.), M. P. about 166–174° (in an open tube) or 186.5–187.5° (vac.) with slight previous shrinking, $\lambda$ max. 271.5 m$\mu$ (log $\epsilon$ 3.09), 278.5 (3.13); $\lambda$ min. 243.5 (1.98), 275.5 (3.04).

Analysis.—Calcd. for $C_{20}H_{22}O_2$: C, 80.49; H, 8.78. Found: C, 80.7; H, 8.77.

After standing for several months the mother liquor from the crystallization of ketone A deposited a second crop of crystals, M. P. 195–201.5°. Two recrystallizations from n-butyl acetate followed by sublimation at 175° (0.1 mm.) yielded material which gave no depression of the M. P. when mixed with authentic trans-anti-trans ketone B.

Ketone A was also produced by allowing the hydrogenation of the enol ether II of the tetracyclic ketone (I) as described above to proceed further to the tetrahydro stage. Hydrogenation of the dihydro enol ether III, over palladium-on-strontium carbonate similarly gave after recrystallization from ethyl acetate, ketone A, M. P. 168–178° (open tube).

The ethylene ketal of ketone-A was prepared from 0.72 g. of ketone, 0.04 g. of p-toluenesulfonic acid monohydrate in 40 ml. of dry toluene, and 6.5 ml. of ethylene glycol. The mixture was heated so that slow distillation occurred over a 7-hour period during which fresh toluene was added to maintain the original volume. A total of 115 ml. of distillate was collected. The mixture was allowed to cool, washed several times with saturated sodium bicarbonate solution, and then with water. The aqueous layers were extracted with ether, and the combined organic layers dried over anhydrous magnesium sulfate. The colorless crystalline product remaining after removal of the solvents at reduced pressure was crystallized from methanol-acetone to give the ketal, M. P. 131–133.5°. Two recrystallizations from methanol acetone gave long colorless blades, M. P. 135.5–137.5, $\lambda$ max. 270 m$\mu$ log $\epsilon$ 3.12), 278.5 (3.14); $\lambda$ min. 243.5 (2.19), 275.5 (3.06).

Analysis.—Calcd. for $C_{22}H_{30}O_3$: C, 77.15; H, 8.83. Found: C, 76.82; H, 8.71.

EXAMPLE X

Trans - anti-cis-1-methoxy-8$\beta$-hydroxy-10a-methyl-4b,5,6, 6a,7,8,9,10,10a,10b,11,12-dodecahydrochrysene (VIII)

A mixture of 3.00 g. of the tetrahydro ketone-A and 30 ml. of dry benzene was warmed to effect dissolution, then 100 ml. of dry purified dioxane and 150 ml. of dry ether were added. A solution of 2.7 g. of lithium aluminum hydride in 100 ml. of dry ether was then added slowly with stirring over a 45-minute period. After the addition, the mixture was heated under reflux for 4.5 hours and allowed to stand overnight at room temperature. Dilute sulfuric acid (8 ml. of concentrated acid in 200 ml. of water) was added cautiously, the layers separated, the aqueous portion extracted with ether, and the combined organic layers dried over anhydrous magnesium sulfate. The oily residue obtained on removal of the solvent at reduced pressure was crystallized from benzene-petroleum ether (100°) to yield the carbinol, M. P. 132–134°. Repeated recrystallization gave colorless blades, M. P. 130.5–132.5°, λ max. 271 mµ (log ε 3.14), 278 (3.15); λ min. 243.5 (2.05), 275 (3.10).

*Analysis.*—Calcd. for $C_{20}H_{28}O_2$: C, 79.95; H, 9.39. Found: C, 80.2; H, 9.44.

This substance gave only a trace of a precipitate with digitonin.

The acetate, prepared with acetic anhydride and potassium acetate in acetic acid, crystallized from dilute ethanol in the form of colorless blades, M. P. 109–109.5°. Two additional recrystallizations raised the M. P. to 109.5–110°.

*Analysis.*—Calcd. for $C_{22}H_{30}O_3$: C, 77.15; H, 8.83. Found: C, 77.6; H, 8.83.

Catalytic hydrogenation of 1.00 g. of the tetrahydroketone in 20 ml. of 95% ethanol and 40 ml. of benzene over 0.20 g. of platinum oxide proceeded to completion (calculated amount of gas absorbed) in 70 minutes at room temperature and 30–40 p. s. i. Crystallization of the product from benzene-petroleum ether (100°) gave the carbinol VIII, M. P. 135–136°, undepressed on admixture with the product described above.

EXAMPLE XI

*1-methoxy-8-hydroxy-10a-methyl-5,6,8,9,10,10a,11,12-octahydrochrysene*

A solution of 2.00 g. of the tetracyclic ketone I, M. P. 169.7–172.2° in 40 ml. of dioxane and 150 ml. of ether was reduced with 0.01 mole of lithium aluminum hydride in 25 ml. of ether. The procedure was essentially the same as that described above for the reduction of the trans-dihydro ketone to VIII. After crystallization from acetone-petroleum ether (60–68°) the product had a M. P. 150.4–154.2°. Recrystallization of this material from aqueous ethanol gave plates which melted and resolidified between 100 and 110°, then remelted at 140.5–142.5°. Occasionally a form, M. P. 138–145°, was obtained from acetone-petroleum ether. Repeated recrystallization from aqueous ethanol gave small colorless plates which after drying for 20 hours at 55° (0.05 mm.) melted at 146.5–147°, λ max. 222 mµ (log ε 4.37), 268.5 (4.06); λ min. 244 (3.67).

*Analysis.*—Calcd. for $C_{20}H_{24}O_2$: C, 81.04; H, 8.16. Found: C, 81.0; H, 8.38.

EXAMPLE XII

*Hydrogenation of 1-methoxy-8-hydroxy-10a-methyl-5,6,8,9,10,10a,11,12-octahydrochrysene*

A solution of 1.182 g. of the carbinol of Example XI, M. P. 147.6–151.1°, in 50 ml. of 95% ethanol was treated with 5% palladium-on-carbon catalyst and the mixture allowed to stand overnight. The catalyst was removed by filtration, and the filtrate shaken with hydrogen at room temperature and atmospheric pressure in the presence of 0.355 g. of 6% palladium-on-strontium carbonate. After 2 hours the calculated (for two double bonds) amount of hydrogen was absorbed, and the reaction was interrupted. The mixture was filtered, the filtrate evaporated, and the residue crystallized from chilled acetone-ether to give colorless needles, M. P. 125.4–128.8°. Repeated recrystallization from acetone-petroleum ether (60–68°) and sublimation at 130° (0.05 mm.) gave material, M. P. 128.8–132.5°, undepressed on admixture with trans-anti-cis-tetrahydro carbinol VIII, M. P. 132–134°, described above. The 128.8–132.5° compound had λ max. 270.5 mµ (log ε 3.08), 278 (3.10); λ min. 243.5 (2.03).

*Analysis.*—Calcd. for $C_{20}H_{28}O_2$: C, 79.95; H, 9.41. Found: C, 79.9; H, 9.32.

EXAMPLE XIII

*Trans-1-methoxy-8-ethylenedioxy-10a-methyl-5,6,6a,-7,8,9,10,10a,11,12-decahydrochrysene (V)*

A solution of 22.7 g. of the trans-dihydro ketone IV, M. P. 167–172° and 1.2 g. of p-toluenesulfonic acid monohydrate in 1.2 l. of dry toluene and 200 ml. of ethylene glycol was boiled under reflux with an arrangement for partial take-off. During 4 hours, 400 ml. of distillate was collected, then an additional 50 ml. of ethylene glycol and p-toluenesulfonic acid were introduced. Refluxing was continued for 4 hours more during which 200 ml. of distillate was collected. The product was isolated as described above for the ethylene ketal of ketone A. The crude product was crystallized from a mixture of 15 ml. of acetone and 250 ml. of methanol to yield colorless needles, M. P. 110–111°. On repeated recrystallization of a sample from another run, the M. P. was 111.5–112°.

*Analysis.*—Calcd. for $C_{22}H_{28}O_3$: C, 77.61; H, 8.29. Found: C, 77.6; H, 8.09.

The ethylene ketal V was also prepared directly from the dihydro enol ether III by reacting 25.62 g. of the latter, M. P. 116–120°, and 1.60 g. of p-toluenesulfonic acid monohydrate in 950 ml. of dry toluene and 200 ml. of ethylene glycol. After a total of 21 hours of refluxing (0.4 g. additional acid being added after 17 hours), and crystallization from acetone-methanol, the ketal was obtained, M. P. 105–107.5°.

EXAMPLE XIV

*Trans-anti-trans-1-methoxy-8-ethylenedioxy-10a-methyl-4b,5,6,6a,7,8,9,10,10a,10b,11,12-dodecahydrochrysene (VI)*

A solution of 3.40 g. of the trans-dihydro ketal V, M. P. 110–111°, in 300 ml. of dry ether was placed in a 1 l. three-necked flask equipped with a sealed wire stirrer, a Dry Ice condenser capped with a soda lime drying tube, and a stopcock sealed to the bottom for draining the flask. The third neck was kept stoppered except when reagents were added. Liquid ammonia (400 ml.) was added rapidly, stirring was started (cautiously at first), the 3.40 g. of lithium wire cut into small (1–2 cm.) pieces was added to the homogeneous solution. A few pieces were first added; then when the solution became completely blue, the remainder was added as fast as possible without loss of liquid through the condenser. After the addition was complete stirring was continued for 15 minutes, then the reaction mixture was drained in a 2 l. beaker containing 33 ml. of absolute ethanol, and the mixture was stirred until all of the blue color disappeared. The ammonia was evaporated by gentle warming on a steam bath.

The above procedure was repeated 10 times, and the residues remaining after evaporation of the ammonia were combined. Water was added, the ether layer separated, and the aqueous layer extracted twice with ether. The combined ether solutions were washed with water until neutral, and dried over anhydrous magnesium sulfate. The residue obtained upon evaporation of the solvent was recrystallized from a mixture of 375 ml. of acetone and 750 ml. of methanol containing a few drops of pyridine. The first crop was colorless blades, M. P. 123–124°. The mother liquor upon chilling deposited a second crop, M. P. 121.5–122.5°.

Repeated recrystallization gave colorless prisms, M. P. 123.5–124.5°.

Analysis.—Calcd. for $C_{22}H_{30}O_3$: C, 77.15; H, 8.83. Found: C, 77.2; H, 8.81.

EXAMPLE XV

Trans-anti-trans-1-methoxy-8-keto-10a-methyl-4b,5,6,6a, 7,8,9,10,10a,10b,11,12-dodecahydrochrysene (B)

(a) FROM THE KETAL

To a solution of 23.17 g. of the ketal VI, in 460 ml. of boiling 95% ethanol was added 38 ml. of water, followed by a solution of 2.6 ml. of concentrated hydrochloric acid in 20 ml. of 95% ethanol, then finally an additional 20 ml. of water. Crystallization began within 1 minute, and the mixture was allowed to stand at room temperature for 5 hours, then at 0° for 3 hours. The yield of ketone B of sufficient purity for reduction to the alcohol, was 19.53 g., M. P. 204.5–206°. A specimen, after two recrystallizations from n-butyl acetate followed by sublimation at 180° (0.01 mm.) was obtained as colorless prisms. It melted at 211–211.5° (vac.) with previous softening and rehardening at about 207° suggesting the existence of an unstable lower-melting form. Remelting of the same sample showed no previous softening, λ max. 271 mμ (log ε 3.13), 278.5 (3.14); λ min. 244 (2.10), 275 (3.08).

Analysis.—Calcd. for $C_{20}H_{26}O_2$: C, 80.49; H, 8.78. Found: C, 80.1; H, 8.83.

(b) FROM 1-METHOXY-8-ETHOXY-10a-METHYL-5,6,6a,7, 10,10a,11,12-OCTAHYDROCHRYSENE (III)

The trans-dihydroenol ether III was reduced by the method described above. Thus from 3.24 g. of dihydroenol ether, M. P. 114–120°, treated in 240 ml. of dimethylcellosolve, 140 ml. of ether and 400 ml. of ammonia with 3.24 g. of lithium and 37 ml. of ethanol, there was obtained upon crystallization of the oily product from absolute ethanol (trace of pyridine), the trans-anti-trans-tetrahydroenol ether, M. P. 104–108°. This material was employed for the hydrolysis described below. Material of this quality on repeated recrystallization from methanol-benzene (trace of pyridine) melted at 118–119°.

A solution of 1.69 g. of the tetrahydroenol ether, M. P. 104–108°, described above in 45 ml. of boiling 95% ethanol was treated with 5.5 ml. of water followed by 0.9 ml. of concentrated hydrochloric acid. After standing for 3 hours at room temperature and overnight at 0°, a crystalline precipitate, M. P. 196.5–202.5° was obtained. Recrystallization from n-butyl acetate gave ketone-B, M. P. 203.5–206.5°.

EXAMPLE XVI

Trans - anti - trans - 1 - methoxy - 8β - hydroxy - 10a - methyl - 4b,5,6,6a,7,8,9,10,10a,10b,11,12 - dodecahydrochrysene (IX)

A solution of 25.9 g. of lithium aluminum hydride in 680 ml. of dry ether was added over a 30-minute period to a stirred, refluxing suspension of finely powdered ketone B, M. P. 204.5–206°, in 300 ml. of dry dioxane, 300 ml. of dry ether and 100 ml. of dry benzene. The mixture was heated under reflux for 5 hours, cooled, ethyl acetate added to decompose the excess lithium aluminum hydride, then a solution of 78 ml. of concentrated sulfuric acid in 1 l. of water was cautiously added. The aqueous layer was extracted with ether, and the combined ether solutions were washed with saturated sodium bicarbonate solution, with water, and dried over anhydrous magnesium sulfate. The residue remaining upon evaporation of the solvent at reduced pressure was crystallized from 180 ml. of petroleum ether (100°) containing a trace of ethyl acetate to yield a product, M. P. 117.5–122°. This substance exsists in two polymorphic forms. Thus when the above material was recrystallized from ethyl acetate-petroleum ether (60–68°) a material, M. P. 136.3–137°, was obtained. In another similar run a material, colorless needles, M. P. 123.5–124.5°, was obtained after three recrystallizations from benzene-petroleum ether (60–68°).

Analysis.—Calcd. for $C_{20}H_{28}O_2$: C, 79.95; H, 9.39. Found: C, 80.1; H, 9.48.

On standing, the lower-melting form changes over to the higher-melting modifications. Both forms have given the same acetate described below.

The acetate, prepared with acetic anhydride and potassium acetate in acetic acid, was obtained as colorless prisms, M. P. 150–150.5° (soft at 149°) after recrystallization from aqueous ethanol and sublimation at 140–150° (0.03 mm.).

Analysis.—Calcd. for $C_{22}H_{30}O_3$: C, 77.15; H, 8.83. Found: C, 76.8; H, 8.56.

EXAMPLE XVII

Trans - syn - cis - 1 - methoxy - 6a - acetoxy - 8 - keto - 10a - methyl - 4b,5,6,6a,7,8,9,10,10a,10b,11,12-dodecahydrochrysene (XXIII)

In a 450 ml. bottle 4.630 g. of 1-methoxy-6a-acetoxy-8-keto-10a-methyl - 5,6,6a,7,8,9,10,10a,11,12 - decahydrochrysene (XXII), M. P. 145.5–146.5°, was dissolved in 200 ml. of hot ethanol. After cooling to room temperature, 1.5 g. of 30% palladium hydroxide on strontium carbonate was added and hydrogenation carried out at 2–3 atmospheres by shaking. The hydrogen uptake the first 2 minutes was accounted to the catalyst and the solvent. After 20 hours the hydrogen uptake was 114% of the theoretical one mole and the reaction was stopped at this point. The catalyst was removed by filtration and washed with hot benzene since some of the product had crystallized. After the solvent had been evaporated in a current of air, the residue was dissolved in benzene, filtered again, and the benzene evaporated. The residue was dissolved in hot ethanol and allowed to cool yielding XXIII, M. P. 177–181°.

EXAMPLE XVIII

Trans - syn - cis - 1 - methoxy - 8 - keto - 10a - methyl -4b,-5,6,6a,7,8,9,10,10a,10b,11,12 - dodecahydrochrysene (XXIV)

In a 1 l. round-bottomed flask 7 g. of sodium was allowed to react with 750 ml. of anhydrous methanol after which a solution of 17.80 g. of the 6a-acetoxy compound XXIII, M. P. 173–180°, in 100 ml. of dry benzene was added. The mixture was refluxed 5 hours at which time it was colored orange. Acetic acid was added dropwise until the color changed abruptly to yellow and most of the solvent was removed under reduced pressure. After water and benzene were added to the residue, the layers were separated and the aqueous layer extracted three times with ether. The combined organic layers were washed with saturated sodium chloride solution. After drying over anhydrous magnesium sulfate, the solvent was evaporated and the residue dried in vacuo to leave a yellow solid, M. P. 132–144°. Recrystallization from ethanol gave XXIV, M. P. 148–150°, and a second crop, M. P. 146–149°.

A lower melting polymorphic form of XXIV was sometimes obtained as hexagons, M. P. 140°. The high melting form usually crystallized as large, irregular, colorless prisms, but also sometimes as large cubes or leaflets. Repeated recrystallization from ethanol gave M. P. 150–151°; λ max. 232 mμ (log ε 4.27); 240 (4.26), 278 (3.30); λ min. 236 (4.25), 275 (3.27).

Analysis.—Calcd. for $C_{20}H_{24}O_2$: C, 81.04; H, 8.16. Found: C, 80.87; H, 8.31.

EXAMPLE XIX

Trans - syn - cis - 1 - methoxy - 8β - hydroxy-10a-methyl-4b,5,6,6a,7,8,9,10,10a,10b,11,12 - dodecahydrochrysene (XXV) and acetate To a 2 l. 3-necked flask containing 1200 ml. of liquid ammonia was added 4.00 g. of ketone XXIV, M. P. 149–151°, dissolved in 100 ml. of absolute ethanol. While the mixture was being stirred, 2.5 g. of lithium wire was added in a 2–3 minute period during which a deep blue color developed. An additional 5 g. of lithium wire was added over a 20 minute period. Stirring was continued an additional 10 minutes at the end of which the blue color had disappeared. Ether was added slowly and the ammonia allowed to boil away by warming the reaction flask first in water and then on a steam-bath. When the ammonia was gone, 500 ml. of water was added and the layers separated. After extracting the aqueous layer three times with ether, the combined ether layers were washed with saturated sodium chloride solution and dried over anhydrous sodium sulfate. The ether was removed by distillation to leave a red oil. The red oil was heated 3 hours on a steam-bath with 50 ml. of isopropenyl acetate and 0.1 g. of p-toluenesulfonic acid monohydrate. After isolating the product by the above procedure, there was obtained from ethanol XXV acetate, M. P. 130–132°, as orange crystals and a second crop, M. P. 128–130°.

In an experiment similar to the one described above, 0.500 g. (1.69 moles) of ketone XXIV, M. P. 148–149°, was reduced to the alcohol XXV by 1.7 g. of lithium in 200 ml. of liquid ammonia and 20 ml. of absolute ethanol. There was isolated an oil which was chromatographed on 12 g. of alumina. When the column was eluted with benzene, there was obtained 0.025 g. of oily material. When the column was eluted with 1:24 chloroform: benzene, there was obtained 0.015 g. of ketone XXIV, M. P. 156–163°. When the column was eluted with 1:1 chloroform:benzene, there was obtained 0.443 g. of alcohol XXXV, M. P. 140–143°.

EXAMPLE XX

*Cis - syn - cis - 1 - methoxy - 8 - keto - 10a - methyl-4b,5,6,6a,7,8,9,10,10a,10b,11,12 - dodecahydrochrysene (C)*

A solution of 2.25 g. of the cis-dihydroketone XI, M. P. 119.5–121° in 30 ml. of 95% ethanol and 30 ml. of benzene was hydrogenated over 0.50 g. of 30% palladium hydroxide-on-strontium carbonate at room temperature and atmospheric pressure. The uptake stopped after 2 hours, 96% of the calculated amount of gas being absorbed. The mixture was filtered, and the filtrate evaporated to give a residue, M. P. 76–92°. Recrystallization of the material from 95% ethanol gave ketone-C, M. P. 97–102°, λ max. 271 (log ε 3.16), 278 (3.19); λ min. 244 (2.37); 275 (3.13). Comparable material from another run was recrystallized from petroleum ether (60–68°), then from methanol to give colorless prisms, M. P. 103–105°.

*Analysis.*—Calcd. for $C_{20}H_{26}O_2$: C, 80.49; H, 8.78. Found: C, 80.2; H, 8.96.

The semicarbazone was obtained from absolute ethanol as colorless microcrystals, M. P. 217–219° (dec.).

*Analysis.*—Calcd. for $C_{21}H_{29}O_2N_3$: C, 70.95; H, 8.22. Found: C, 70.6; H, 8.28.

EXAMPLE XXI

*Cis-syn-cis-1-methoxy-8α-hydroxy-10a-methyl-4b,5,6,6a,7,8,9,10,10a,10b,11,12-dodecahydrochrysene*

A solution of 0.725 g. of ketone-C, M. P. 97–102°, in 25 ml. of dioxane, 10 ml. of benzene and 50 ml. of ether was treated with 10 ml. of 1 M lithium aluminum hydride as described above for the preparation of the trans-anti-trans-8β-hydroxy compound (IX) except that the mixture was refluxed for only 30 minutes. A solution of the crude product was adsorbed on a column of activated alumina (20 g.). Recrystallization of the fraction which was eluted with 2:3 chloroform-benzene, from petroleum ether (60–68°) gave the carbinol, M. P. 123–125°.

EXAMPLE XXII

*Cis-1-methoxy-8-ethylenedioxy-10a-methyl-5,6,6a,7,8,9,10,10a,11,12-decahydrochrysene (XII)*

A mixture of 1.00 g. of the cis-dihydro ketone XI, M. P. 117–119°, 9 ml. of ethylene glycol, 50 ml. of toluene and 0.04 g. of p-toluenesulfonic acid monohydrate was slowly distilled. Each time 10 ml. of distillate was collected, 10 ml. of fresh toluene was added to the reaction mixture, and this process was continued for 4 hours. Then 1 ml. of ethylene glycol and about 10 mg. of acid catalyst were added, and the distillation operations continued for an additional 2 hours. The product was isolated as described above for the ketal of ketone A. The crude oily product was evaporatively distilled at 0.01 mm. After a forerun of 0.10 g. collected at 125–130°, the desired product was obtained at 140–150°.

*Analysis.*—Calcd. for $C_{22}H_{28}O_3$: C, 77.61; H, 8.28. Found: C, 77.9; H, 8.28.

EXAMPLE XXIII

*Lithium reduction of the cis-dihydro ketal (XII)*

Approximately 220 ml. of ammonia was added carefully to a solution of 2.23 g. of the ketal (produced as described above) in 210 ml. of anhydrous ether. Lithium wire (0.190 g.) was added with stirring, and after dissolution was complete the dark green-colored solution was stirred for 20 minutes, then an excess absolute ethanol was added dropwise, and the ammonia evaporated by warming. The mixture was diluted with water, the aqueous portion extracted with chloroform, and the combined organic layer dried over anhydrous sodium sulfate. The residue obtained upon evaporation of the solvent was crystallized from ethyl acetate to give cis-anti-cis-1-methoxy - 8 - ethylenedioxy - 10a - methyl - 4b,5,6,6a,7,8,9,10,10a,10b,11,12-dodecahydrochrysene (XIV), M. P. 209–211°. Recrystallization from ethyl acetate gave colorless blades, M. P. 211.5–212°. This material sublimed readily at 165° (0.01 mm.).

*Analysis.*—Calcd. for $C_{22}H_{30}O_3$: C, 77.15; H, 8.83. Found: C, 77.6; H, 8.87.

The mother liquor from the 209–211° material was evaporated and the residue crystallized from petroleum ether (60–68°) giving cis-anti-trans-1-methoxy-8-ethylenedioxy - 10a - methyl - 4b,5,6,6a,7,8,9,10,10a,10b,11,12-dodecahydrochrysene (XIII), M. P. 108–110°. Repeated recrystallization gave colorless prisms, M. P. 110.2–110.8°.

*Analysis.*—Calcd. for $C_{22}H_{30}O_3$: C, 77.15; H, 8.83. Found: C, 77.4; H, 8.78.

EXAMPLE XXIV

*Cis-anti-cis-1-methoxy-8-keto - 10a - methyl - 4b,5,6,6a,7,8,9,10,10a,11,12-dodecahydrochrysene (E)*

A mixture of 0.250 g. of the ketal XIV, M. P. 210–212°, 10 ml. of dry acetone, and a few crystals of p-toluenesulfonic acid monohydrate was heated for 4 hours on the steam bath. Water was added dropwise to the point of incipient cloudiness. The crystals obtained on cooling had a M. P. 171–173°. A specimen was recrystallized twice from 95% ethanol to give colorless needles, M. P. 173.5–174.5°, λmax. 271 mμ (logε 3.20), 278.5 (3.20); λmin. 244 (2.20, 275.5 (3.15).

*Analysis.*—Calcd. for $C_{20}H_{26}O_2$: C, 80.49; H, 8.78. Found: C, 80.5; H, 8.58.

EXAMPLE XXV

*Hydrolysis of the cis-anti-trans-tetrahydro ketal (XIII)*

A specimen of the ketal, M. P. 110.2–110.8°, was hydrolyzed under the conditions described above. After recrystallization from benzene-petroleum ether the product ketone-D melted at 134–136°.

EXAMPLE XXVI

*Cis - anti - cis - 1 - methoxy - 8 - hydroxy - 10a - methyl - 4b,5,6,6a,7,8,9,10,10a,10b,11,12-dodecahydrochrysene*

A solution of 0.20 g. of ketone E, M. P. 173–174°, in 10 ml. of dioxane acid 20 ml. of ether was treated with a solution of 0.06 g. of lithium aluminum hydride in 4 ml. of ether. The mixture was heated under reflux for 1 hour, and the product isolated essentially as described above for the trans-dihydro compound (VII). Repeated recrystallization of the crude product from benzene-petroleum ether (60–68°) and from ethanol eventually gave material melting at 176–180°. After sublimation in high vacuum it was obtained as colorless microcrystals, M. P. 178–181°. On treatment with digitonin it did not form an appreciable precipitate, and the compound is accordingly assigned the 8α-hydroxy configuration.

*Analysis.*—Calcd. for $C_{20}H_{28}O_2$: C, 79.95; H, 9.39. Found: C, 79.7; H, 9.33.

From the more soluble fractions in the crystallization of the 176–180° material, a second isomer was isolated as colorless prisms, M. P. 157.6–158.2°, after repeated recrystallization from benzene-petroleum ether (60–68°). On treatment with digitonin, a noticeable precipitate formed. The compound is therefore assigned the 8β-hydroxy configuration.

*Analysis.*—Calcd. for $C_{20}H_{28}O_2$: C, 79.95; H, 9.39. Found: C, 79.9; H, 9.45.

When the carbonyl group of ketone E was reduced with hydrogen over platinum oxide in 95% alcohol containing a trace of acetic acid, a comparable mixture of carbinols was produced.

EXAMPLE XXVII

*Cis - anti - trans - 1 - methoxy - 8α - hydroxy - 10-methyl-4b,5,6,6a,7,8,9,10,10a,10b,11,12 - dodecahydrochrysene (XV)*

To a solution of 1.700 g. of the cis-dihydro-8α-hydroxy compound X, M. P. 156–158°, described above, in 200 ml. of dry ether, was added 256 ml. of liquid ammonia followed by 0.184 g. of lithium wire. The mixture was stirred for 15 minutes, then anhydrous ethanol was added slowly until the blue color disappeared. The ammonia and ether were evaporated on the steam bath, ice water was added, and the solid taken up in benzene. The benzene solution was washed with water, 5% hydrochloric acid and saturated brine. The residue obtained on evaporation of the solvent was crystallized from benzene-petroleum ether (60–68°) to give colorless needles, M. P. 150–152°. Repeated recrystallization from benzene-petroleum ether (60–68°) and from acetone-petroleum ether (60–68°) gave colorless needles, M. P. 155.2–155.7°, $\lambda$max. 272 m$\mu$ (log$\varepsilon$ 3.13), 278 (313); $\lambda$min. 244.5 (2.20), 275 (3.07).

EXAMPLE XXVIII

*1 - methoxy - 8 - hydroxy - 10a - methyl - 4b,5,6,6a,7,8,9, 10,10a,10b,11,12-dodecahydrochrysene (IX)*

(A) Ten gms. of the tetracyclic ketone (I), M. P. 172–175°, was dissolved in 200 ccs. of dry, purified dioxan and added cautiously to a stirred solution of ethanol (350 ccs., commercial "absolute") in liquid ammonia (1,500 ccs.) contained in a 3 l. three-necked flask. The resulting suspension was stirred vigorously using a large Hershberg stirrer, and 46 gms. of sodium metal was added slowly, in small portions which had been pressed out to have as big a surface area as possible. After the first few pieces of sodium had reacted vigorously, the reaction mixture became intensely blue on further additions of the metal; when the blue color disappeared, it was noticed that all of the material was now in solution. When all of the sodium had been added, and the last of the blue color had disappeared, the ammonia was removed from the stirred solution by warming on a steam-bath under a stream of nitrogen. Water (one l.) was then added, the organic material extracted thoroughly with chloroform, the extract washed with water until neutral to litmus, dried over anhydrous sodium sulphate, and the solvent removed completely under diminished pressure.

The oil remaining after removal of the solvent and which set to a glass was dissolved in a small volume of ether, and allowed to stand at room temperature. The solid which separated was removed, washed with a little ether, the filtrate concentrated, allowed to crystallize and the process repeated until no more solid separated from the mother-liquors. In this manner, several fractions were collected including a colorless fraction with a M. P. 124–129°. About 2 gms. of this methoxy alcohol (IX) containing fraction was dissolved in 6 ccs. of dry benzene, diluted with 30 ccs. of light petroleum (B. P. 60–68°), and placed on a 60 gm. column of activated magnesium silicate (Florisil) made up in light petroleum (B. P. 60–68°). Elution with benzene-light petroleum (1:3) to (1:1) gave 6 oily fractions and elution with benzene-light petroleum (3:1) gave 8 additional fractions including fraction 7 with a M. P. 125–131° and fraction 10 with a M. P. 129–130°. Fraction 10 was crystallized from ethyl acetate-light petroleum (B. P. 60–68°) and the methoxy alcohol (IX) was obtained as an amorphous solid, M. P. 128–130°. Sublimation under high vacuum at 100° gave a sample in the form of colorless prisms, M. P. 130–132°.

Methoxy alcohol (IX) acetate

The methoxy alcohol (100 mgm., M. P. 125–131°, from fraction 7) was heated under reflux with isopropenyl acetate (15 ccs.) containing concentrated sulfuric acid (one drop) for two hours. After cooling, the solution was poured into saturated aqueous sodium bicarbonate, extracted with benzene, and the solvent removed under reduced pressure from the washed and dried extract. The residual brownish oil crystallized partially on standing: it was dissolved in dry benzene (2 ccs.), diluted with light petroleum (B. P. 60–68°, 2 ccs.) and placed on a column of neutral alumina (4 gms.) made up in light petroleum (B. P. 60–68°). The following fractions were collected:

| | M. P., degrees |
|---|---|
| (1) Benzene-light petroleum (B. P. 60–68°) (1:1), 50 ccs., 62.9 mgms | 143–148 |
| (2) Benzene-light petroleum (B. P. 60–68°) (1:1), 50 ccs., 11.0 mgms | 144–148 |
| (3) Benzene-light petroleum (B. P. 60–68°) (1:1), 50 ccs., 3.2 mgms | 146–149 |
| (4) Benzene-light petroleum (B. P. 60–68°) (3:1), 50 ccs., 2.5 mgms | 146–149 |

The combined solids were sublimed at 136°/high vacuum (M. P. 149–151°, with slight softening at 147°) and then crystallized from ethanol. The desired acetate product was obtained with a M. P. of about 149–150.5°. It can be hydrolyzed in boiling ethanol containing aqueous KOH to pure compound (IX).

(B) About 1000 mgms. of the tetracyclic ketone (I), M. P. 174–176°, in dry purified dioxan (25 ccs.) was added carefully to liquid ammonia (400 ccs.) containing ethanol (35 ccs., commercial "absolute"). To the stirred mixture, sodium (6.3 gms.) was added slowly in small pieces to maintain a blue solution.

At the end of the reaction, the product was isolated with chloroform, and the resultant yellowish oil crystallized on cooling. The solid, after washing with ether, showed M. P. 121–125°. A small amount of material insoluble in a large volume of ether (presumably a dimeric reduction product) was removed by filtration, and the solvent removed, giving a crystalline solid, M. P. 123–125°. Crystallization from light petroleum (B. P. 90–100°) gave the desired methoxy alcohol (IX) as colorless prisms, M. P. 126–127°.

(C) In a similar process to that described in (B)

above, the isolated crude yellow product was crystallized by swirling with ether. Sublimation at 112°/high vacuum followed by crystallization from light petroleum (B. P. 90–100°) gave the desired methoxy alcohol (IX) as colorless prisms, M. P. 127–128°.

EXAMPLE XXIX dl - 18 - nor - D - homo - 13(14) - androsten - 3β - ol - 17a - one (XVIII) and dl - 18 - nor - D - homo - 16(17) - androsten - 3β - ol - 17a - one (XIX)

About 1000 mgms. of the methoxy alcohol (IX), M. P. 124–125°, dissolved in commercial absolute ethanol (130 ccs.) was added cautiously to liquid ammonia (150 ccs.) contained in a wide-necked one-l. flask. With vigorous stirring, lithium wire (10 gms.) was added slowly, in small portions. The wire became coated immediately with a bronze-colored liquid which was dispersed rapidly throughout the mixture as small globules, and the mixture assumed a uniform dull-brown color. At the end of the addition of the metal, ethanol was added to remove last traces of lithium, the ammonia was removed by evaporation, water was added to dissolve the lithium ethoxide, the organic material was extracted with chloroform and the extract washed and dried. The pale yellow residue obtained after removal of the solvent was dissolved in 50 ccs. of ethyl acetate and heated under reflux for 15 minutes with aqueous hydrochloric acid (20 ccs. of N/2). Isolation of the hydrolyzed product with chloroform gave a pale viscous oil. This oil was dissolved in dry benzene (10 ccs.), diluted with light petroleum (B. P. 60–68°) and placed on a column of activated magnesium silicate (Florisil) (40 gms.) made up in light petroleum (B. P. 60–68°). The major fractions from the column included the following:

| Eluting Solvent | Fraction No. | Volume, ccs. | Product |
|---|---|---|---|
| Pure Benzene | 8–16, incl. | 2,500 | M. P. 123–125°. |
| Benzene—10% ether to Benzene—50% ether. | 17–19, incl. | 750 | non-ketonic, oil. |
| Pure ether | 20 | 200 | Oil. |
| Do | 21 | 200 | Oil. |
| Do | 22–28, incl. | 2,150 | Oil. |

The fractions 8–16 inclusive were crystallized from light petroleum (B. P. 90–100°): colorless prismatic needles were obtained, M. P. 124–125°, giving no depression on admixture with starting material.

Fractions 22–28 inclusive crystallized on adding ether. Two crystallizations from diisopropyl ether, followed by sublimation at 130°/high vacuum and recrystallization from the same solvent yielded the 13:14 dehydro ketone XVIII as colorless elongated hexagonal prisms, M. P. 163.5–165°.

From fractions 20 and 21 was isolated a further quantity of the same ketone (XVIII). Concentration of the mother-liquors yielded a colorless oil showing $$\lambda_{max}^{EtOH} 225 m\mu$$

which crystallized on leaving with ether. Sublimation at 125°/high vacuum followed by crystallization from diisopropyl ether yielded the ketone (XIX) as colorless rods, M. P. 138–139°. In chrysene nomenclature XVIII is trans - anti - trans - 1 - keto - 8 - hydroxy - 10a - methyl - 1,2,3,4,4b,5,6,6a,7,8,9,10,10a,10b,11,12 - hexadecahydrochrysene and XIX is trans - anti - trans - 1 - keto - 8 - hydroxy - 10a - methyl - 1,4,4a,4b,5,6,6a,7,8,9,10,10a,10b, 11,12,12a-hexadecahydrochrysene.

EXAMPLE XXX

Direct conversion of the tetracyclic ketone (I) to the 13:14 dehydro ketone (XVIII) and 16:17 dehydro ketone (XIX)

(A) A solution of 20 gms. of the tetracyclic ketone (I), M. P. 172–175°, in a mixture of 300 ccs. of dry, purified dioxan and ethanol (one l., commercial "absolute") was added carefully to 3 l. of liquid ammonia stirred with a large Hershberg stirrer driven by an air-motor, contained in a 12-l. round bottomed wide-necked flask.

Lithium metal (159 gms. in the form of wire, 4,900 cms.) was then added to the vigorously stirred mixture in approximately one-inch portions. At first the solution, cloudy due to the partial suspension of the ketone, was blue only in streaks around the undissolved metal. During the first twenty-five minutes, four meters of wire were added: after the addition of more ethanol (100 ccs.), the appearance of bronze-red globules was noticed on the surface of the still blue-flecked mixture as more lithium was added. The tenth meter had been added after forty-five minutes, followed by ethanol (100 ccs.), and again ethanol (200 ccs.) after the fourteenth meter at the end of one hour. Liquid ammonia (one l.) and ethanol (100 ccs.) were added with the twentieth meter at eighty minutes from the beginning of the reaction, and ethanol (100 ccs.) again after the twenty-third meter (ninety minutes).

Further liquid ammonia (one l.) was added with the twenty-eighth meter after 110 minutes, and again (one l.) plus ethanol (200 ccs.) after the thirty-second meter (170 minutes). The forty-ninth meter, together with ethanol (100 ccs.), was added 150 minutes from the start of the reduction. Under these conditions, the reaction mixture remains an even dull bronze color throughout the reaction from the fifth meter onwards.

The reaction mixture was then left to stir until most of the lithium had disappeared, additional ammonia (one l.) being added to prevent the liquid from becoming too viscous. Finally, ethanol (500 ccs.) was added to remove any unreacted lithium, and the ammonia was allowed to evaporate from the stirred mixture under a rapid stream of nitrogen. Water (2-l.) was then added slowly to dissolve the solid lithium ethoxide, and the product isolated by thorough extraction with chloroform. The removal of solvent from the washed and dried solution gave a viscous, red oil, which showed only end-absorption in the ultra-violet spectrum.

This oil was heated under reflux in ethanol (200 ccs., commercial "absolute") containing aqueous hydrochloric acid (8%, 30 ccs.) for one hour in an atmosphere of nitrogen. After removing most of the ethanol under reduced pressure at 20°, water was added, and the organic material extracted with chloroform. After washing and drying the product was isolated as a dark-red glass.

The glass was next dissolved in dry benzene (150 ccs.), diluted with light petroleum (B. P. 60–68°, 50 ccs.) and placed on a column of activated magnesium silicate (Florisil) (600 gms.) made up in light petroleum (B. P. 60–68°). The major fractions collected included the following:

| Eluting Solvent | Fraction No. | Volume, l. | Properties |
|---|---|---|---|
| Benzene—10% ether | 14–17 inclusive | 4 | Red oil. |
| Do | 18–24 inclusive | 7 | Pale yellow oil. |
| Benzene—20% ether | 25–27 inclusive | 4 | Oil, crystallized. |
| Benzene—20% ether to Benzene Pure ether | 28–37 inclusive | 21 | Do. |

Fractions 25–27 inclusive were combined and crystallized from diisopropyl ether, giving a solid of M. P. 134–139°. After sublimation at 110°/high vacuum, this gave the 16:17 dehydro ketone (XIX) as rosettes of colorless prisms, M. P. 138–139°. Fractions 28–37 inclusive were treated similarly, giving the 13:14 dehydro ketone (XVIII) M. P. 161–163°.

The crude hydrolyzed product described above can be dissolved in ethanol containing a little glacial acetic acid and treated with Girard's reagent "P" or "T" under the conditions used by Reichstein, Helv. Chim. Acta 19, 1107

(1936), in the separation of the adrenal cortical hormones. No pure material was isolated by these procedures but they may be used to advantage when dealing with large scale reductions in order to decrease the amount of material to be chromatographed.

(B) This reduction was run under the same conditions as that recorded in (A) above except that the concentration of ammonia was controlled throughout the reaction so that, although the bronze phase was present, the mixture always verged upon the blue also (this was achieved by the cautious addition of ethanol at frequent intervals to prevent the blue color from becoming pronounced).

The isolation and hydrolysis of the crude reduction product were carried out as described above. The hydrolyzed material was a much lighter-red oil and, on dissolution in ether (50 ccs.) and leaving at 0° for twelve hours, a colorless solid separated. The filtrate from this solid yielded a further quantity of material on concentration and leaving at 0° for several hours. The two solid fractions were combined and sublimed at 138°/high vacuum, giving colorless rods M. P. 162–164°, of the 13:14 dehydro ketone (XVIII).

The oil obtained by complete removal of solvent from the mother liquors was dissolved in benzene (200 ccs.) and placed on a column of activated magnesium silicate (Florisil) (600 gms.) made up in the same solvent. The fractions obtained included the following:

| Eluting Solvent | Fraction No. | Volume, l. | Product |
| --- | --- | --- | --- |
| Benzene—20% ether | 44 | 2 | $\lambda_{max}^{EtOH}$ 227 m$\mu$. |
| Do | 45 | 2 | $\lambda_{max}^{EtOH}$ 229 m$\mu$. |
| Do | 46 | 2 | $\lambda_{max}^{EtOH}$ 235 m$\mu$. |
| Benzene—50% ether | 47 | 1 | $\lambda_{max}^{EtOH}$ 243 m$\mu$. |
| Do | 48 | 1 | $\lambda_{max}^{EtOH}$ 246 m$\mu$. |
| Benzene—50% ether—2% ethanol | 49–62 | 25 | $\lambda_{max}^{EtOH}$ 248 m$\mu$. |

Pure 13:14 dehydro and 16:17 dehydro ketones (XVIII) and (XIX) were isolated from these latter fractions as described above in (A).

EXAMPLE XXXI

Conversion of the 13:14 dehydro ketone (XVIII) to dl-18-nor-D-homoandrostan-3$\beta$-ol-17a-one (XX)

(A) IN NEUTRAL SOLUTION

The 13:14 dehydro ketone (1000 mgms., M. P. 163–165°) was dissolved in ethanol (50 ccs., distilled over Raney nickel), catalyst (30% Pd(OH)$_2$/SrCO$_3$, 300 mgms.) added, and the mixture shaken at an initial pressure of 36.0 lbs./square inch of hydrogen. The pressure dropped rapidly to 28.5 lbs., due to catalyst and solvent uptake, and then to 18.0 lbs. during fifteen minutes.

After filtration from the catalyst and removal of the solvent, a colorless oil was obtained which showed no absorption in the ultra-violet, and which crystallized partially on standing in the presence of ether. This residue from the reduction (oil plus solid) was heated under reflux in ethanolic potassium hydroxide (50 ccs. of 0.4 N) for one hour. After neutralization with glacial acetic acid, concentration under reduced pressure and isolation with benzene, the colorless resulting oil crystallized from light petroleum in prisms, M. P. 157–160°. Recrystallization from aqueous ethanol gave the desired compound (XX) M. P. 158–161°, unchanged by sublimation at 142°/high vacuum.

(B) IN THE PRESENCE OF BASE

The 13.14 dehydro ketone (901 mgms., M. P. 161–164°) in ethanol (150 ccs., distilled over Raney nickel) and containing potassium hydroxide (60 mgms.) was shaken under an initial pressure of 38.0 lbs./square inch of hydrogen in the presence of 10% Pd/C (300 mgms.). Reduction proceeded rapidly, absorption having ceased after ten minutes. Neutralization, removal of solvent, and isolation of the product in the normal manner gave (XX) as a colorless oil which crystallized from light petroleum (B. P. 90–100°), M. P. 157–159°.

EXAMPLE XXXII

Conversion of 16:17 dehydro ketone (XIX) to dl-18-nor-D-homoandrostan-3$\beta$-ol-17a-one (XX)

The 16:17 dehydro ketone (470 mgms.) was dissolved in ethanol (20 ccs., distilled over Raney nickel) and 10% Pd/C catalyst (commercial, 100 mgms.) added. The mixture was stirred with hydrogen at atmospheric pressure, the theoretical absorption being complete in nine minutes, after which absorption ceased. The catalyst was removed by filtration, and the solvent distilled off at reduced pressure, yielding a colorless oil which crystallized in colorless prisms on adding light petroleum (B. P. 90–100°). The saturated keto-alcohol (XX) was obtained with a M. P. 158–160°.

EXAMPLE XXXIII

Conversion of the keto-alcohol compound (XX) to dl-18-nor-D-homoandrostane-3,17a-dione (XXI)

To a solution of 0.29 gm. of the saturated keto-alcohol (XX) in 20 ml. of acetic acid was added 0.88 gm. of chromic anhydride in 1.0 ml. of water. After eight hours the solution was poured into aqueous sodium carbonate. After standing overnight the resulting precipitate was filtered, washed with water and dried. The residue recovered had a M. P. 127–142°. This material was sublimed and then recrystallized from aqueous ethanol to yield matted needles, M. P. 142–145°. Further purification through the bisulfite addition compound and recrystallization from methylcyclohexane raised the melting point of the desired saturated diketo compound (XXI) to 149–150.5°. This product has androgenic activity. In chrysene nomenclature compound (XX) in Example XXXI is trans-anti-trans-anti-trans-1-keto - 8$\beta$ - hydroxy - 10a-methyl-octadecahydrochrysene and compound (XXI) in Example XXXIII is trans-anti-trans-anti-trans-1,8-diketo-10a-methyl-octahydrochrysene.

The various stereoisomers of the carbinol IX, e. g. VIII, XXV, XV, etc. can be analogously reduced to the corresponding stereoisomers of structure XX, and the latter oxidized to the stereoisomers of the diketone structure XXI. For example, the trans-anti-cis carbinol VIII can be reduced according to the procedure described above in Examples XXIX and XXXI or by catalytic hydrogenation of the aromatic ring. In the latter case there was obtained a compound having the Formula XX with trans-anti-cis-syn-trans configuration, and having the M. P. 129–130.5°. (Analysis.—Calcd. for $C_{19}H_{30}O_2$: C, 78.57; H, 10.41. Found C, 78.73; H, 10.76.) Acetate, M. P. 168–168.5°. (Analysis.—Calcd. for $C_{21}H_{32}O_3$: C, 75.86; H, 9.70. Found: C, 76.09; H, 9.75.) The latter carbinol XX was oxidized with potassium chromate in glacial acetic acid to give a diketone of structure XXI with trans-anti-cis-syn-trans configuration, and having the M. P. 123.5–125.5°. (Analysis.—Calcd. for $C_{19}H_{28}O_2$: C, 79.12; H, 9.78. Found: C, 79.45; H, 10.06.)

In compounds I and IX and the other compounds having an RO group at the 1-position, the methoxy group can be replaced by other lower alkoxy groups such as ethoxy, propoxy, butoxy, etc. R, in addition to being a lower alkyl group, can be any equivalent inert aliphatic group containing from 1 to about 8 carbon atoms. The R or lower alkyl blocking group, for example, can contain a hydroxy group or groups as well as a lower alkoxy group and include equivalent groups such as 2-hydroxyethyl, 2,3-dihydroxypropyl, 2-methoxyethyl, 2-ethoxyethyl and the like. It serves merely as a blocking or protective group during the initial reactions and is removed as shown in compounds XVIII and XIX to provide the desired keto group. All references to melting and boiling points herein are given in ° C.

The compounds of the invention having a hydroxy group in the 8-position of the chrysene nucleus can be utilized either in the free alcohol form or in the form of esters derived from carboxylic acids of relatively low molecular weight, i. e. from one to about eight carbon atoms. The nature of the acyloxy groups in the 8-position of said esters is not critical, but preferred types are those derived from lower aliphatic carboxylic acids, monocycloaliphatic carboxylic acids and monocarbocyclic aromatic acids. Illustrative of such preferred types of acyl groups are lower-alkanoyloxy groups; e. g. formyloxy, acetoxy, propionoxy, butyroxy, isobutyroxy, valeryloxy, trimethylacetoxy, caproyloxy, isocaproyloxy, heptanoyloxy, octanoyloxy, and the like; carboxyl-lower-alkanoyloxy groups; e. g. hemi-succinyloxy, hemi-glutaryloxy, hemi-adipyloxy, and the like; and mono-carbocyclic aroyloxy groups, e. g. benzoyloxy, p-toluyloxy, p-nitrobenzoyloxy, 3,5-dinitrobenzoyloxy, and the like. The acyloxy groups can contain substituents such as nitro, methoxy, halogen, etc. which are inert to the reaction conditions used for the preparation of the esters.

The present application is a continuation-in-part of our application, Serial No. 390,074, filed November 3, 1953, and now abandoned.

We claim:

1. A compound selected from the group consisting of 1 - RO - 8 - X - 10a-methyl-5,6,6a,7,8,9,10,10a,11,12-decahydrochrysene and 1-RO-8-X-10a-methyl-4b,5,6,6a,7; 8,9,10,10a,10b,11,12-dodecahydrochrysene, in which R is a lower alkyl blocking group and X is selected from the class consisting of hydroxy, acyloxy, keto and ethylenedioxy.

2. 1 - methoxy - 8 - keto - 10a - methyl - 4b,5,6,6a,7,8,9, 10,10a,10b,11,12-dodecahydrochrysene.

3. 1 - methoxy - 8 - keto - 10a - methyl - 5,6,6a,7,8,9, 10,10a,11,12-decahydrochrysene.

4. 1 - methoxy - 8 - hydroxy - 10a - methyl - 4b,5,6,6a, 7,8,9,10,10a,10b,11,12-dodecahydrochrysene.

5. A compound selected from the group consisting of 1 - keto - 8 - hydroxy - 10a - methyl - 1,2,3,4,4b,5,6,6a, 7,8,9,10,10a,10b,11,12 - hexadecahydrochrysene and 1-keto - 8 - hydroxy - 10a - methyl - 1,4,4a,4b,5,6,6a,7,8, 9,10,10a,10b,11,12,12a-hexadecahydrochrysene.

6. $dl$ - 18 - nor - D - homo - 13(14) - androsten - 3β-ol-17a-one.

7. $dl$ - 18 - nor - D - homo - 16(17) - androsten - 3β-ol-17a-one.

8. A compound selected from the group consisting of 1 - keto - 8 - hydroxy - 10a - methyl - octadecahydrochrysene and 1,8 - diketo - 10a - methyl - octadecahydrochrysene.

9. The compound, $dl$-18-nor-D-homoandrostan-3-β-ol-17a-one.

10. The compound, $dl$ - 18 - nor-D-homoandrostane-3, 17a-dione.

11. The process of preparing the 13:14 dehydro and 16:17 dehydro ketones of claim 5, which comprises reducing 1 - RO - 8 - hydroxy - 10a - methyl - 4b,5,6,6a,7,8, 9,10,10a,10b,11,12-dodecahydrochrysene, where R is a lower alkyl group, in a liquid ammonia-alcoholic reaction mixture by addition of lithium, and hydrolyzing the resulting intermediate by heating with aqueous acid.

12. The process which comprises reducing 1-methoxy-8 - keto - 10a - methyl - 5,6,8,9,10,10a,11,12 - octahydrochrysene in a liquid ammonia-ethanol-lithium reaction mixture, hydrolyzing the resulting product by heating with aqueous acid and catalytically reducing with palladium catalyst the resulting 13(14)- and 16(17) dehydro ketones to $dl$-18-nor-D-homoandrostan-3β-ol-17a-one.

13. The process which comprises reducing 1-lower alkoxy - 8 - hydroxy - 10a - methyl - 4b,5,6,6a,7,8,9,10,10a, 10b,11,12-dodecahydrochrysene in a liquid ammonia-alcoholic-lithium reaction mixture, hydrolyzing the resulting product by heating in aqueous acid, catalytically reducing with palladium catalyst the 13(14)- and 16(17)-dehydro - ketones to 1 - keto - 8-hydroxy-10a-methyl-octadecahydrochrysene and oxidizing the latter with chromic oxide to 1,8-diketo-10a-methyl-octadecahydrochrysene.

References Cited in the file of this patent

FOREIGN PATENTS 235,431     Switzerland _____ Nov. 30, 1944

OTHER REFERENCES

Woodward et al.: J. Am. Chem. Soc. 74, 4223–4251 (1952).